June 26, 1934.                C. S. BURNETT                1,963,969
                         INTERNAL EXPANSION BRAKE
                     Filed April 15, 1932      3 Sheets-Sheet 1
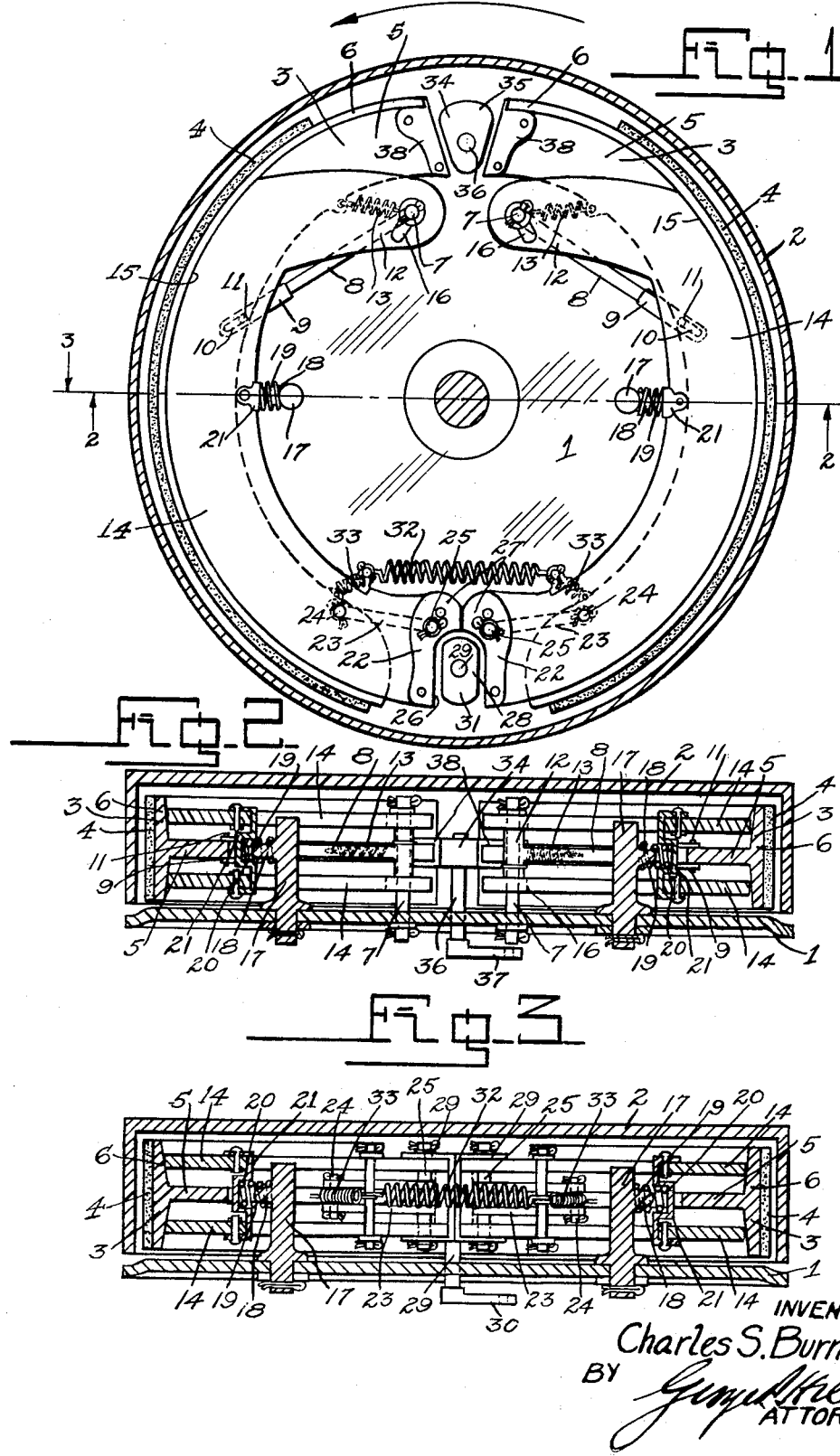
INVENTOR.
Charles S. Burnett.
BY
ATTORNEY.

June 26, 1934.                 C. S. BURNETT                    1,963,969
                         INTERNAL EXPANSION BRAKE
                         Filed April 15, 1932        3 Sheets-Sheet 2
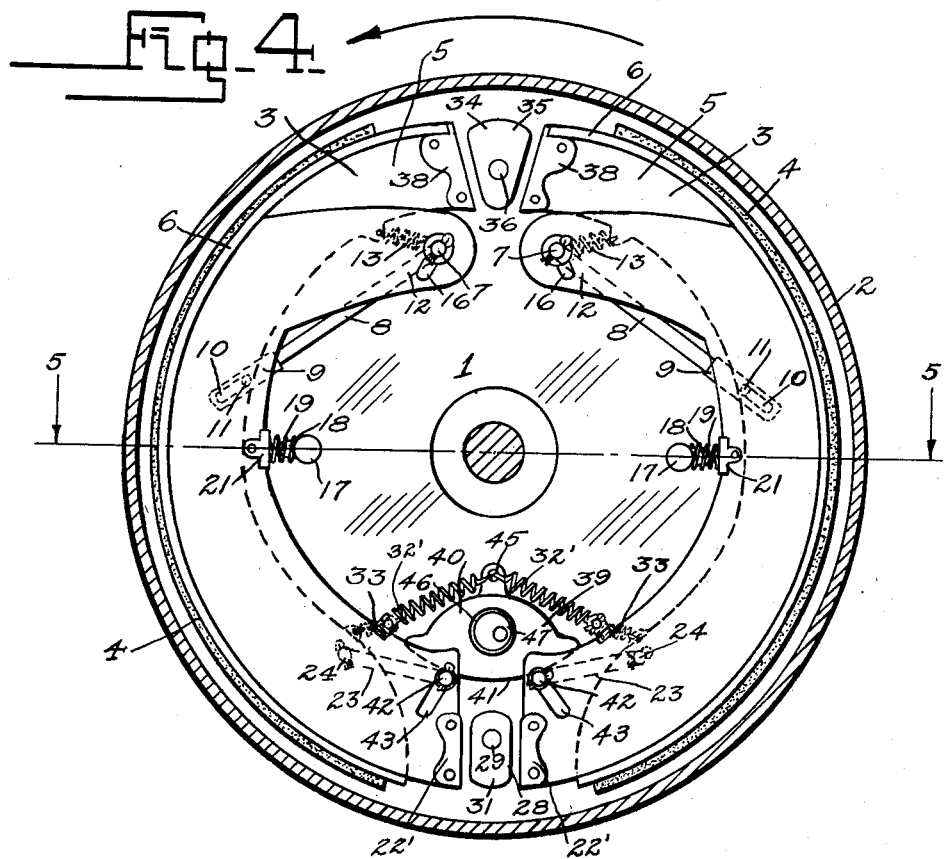
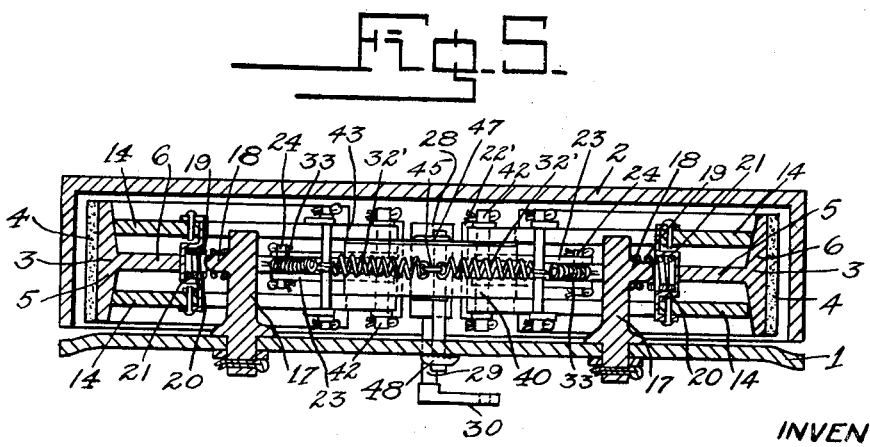
INVENTOR
Charles S. Burnett.
BY
ATTORNEY.

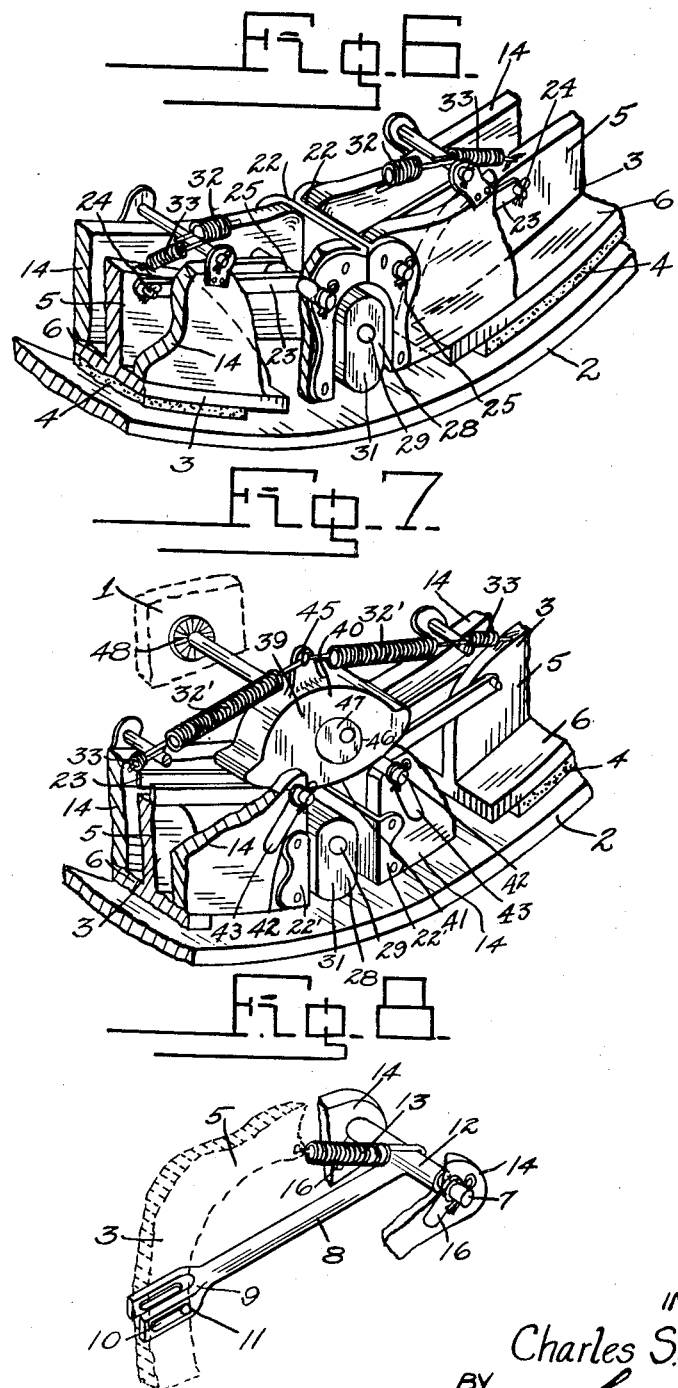

Patented June 26, 1934

1,963,969

UNITED STATES PATENT OFFICE 1,963,969

INTERNAL EXPANSION BRAKE

Charles S. Burnett, San Francisco, Calif.

Application April 15, 1932, Serial No. 605,457

12 Claims. (Cl. 188—78)

(Granted under the act of March 3, 1883, as amended April 30, 1928; 370 O. G. 757)

This invention described herein may be manufactured and used by or for the Government for governmental purposes without the payment to me of any royalty thereon.

This invention relates to improvements in brakes and has particular application to brakes of that type known as internal expanding band brakes.

One of the objects of the invention is to provide a dual operated internal expansion brake which is adapted to follow a varying friction surface such as an eccentric drum without appreciable variation of distribution of pressure upon the friction surface.

Another object of the invention is to provide a dual operated internal expansion brake which is extremely flexible without loss of pressure applied thereto and which permits maximum efficiency even after the wheel to which it may be applied no longer rotates about a fixed center.

Another object of the invention is to provide a dual operated brake of the internal expansion type which is adapted to be individually adjusted against wear without causing counter action in exact opposite direction to the adjustment.

Still another and important object of the invention is to provide a dual operated brake of the internal expansion type having its energization controlled for softness of setting and safety of the brake, which is provided with means to brake at will any sticking or grabbing of the brake and to control the extent of the brake holding under all conditions and at all times.

Heretofore the brakes employed on vehicles and the like were not provided with means for causing the brake to follow a varying friction surface, such as an eccentric drum, without appreciable variation of distribution of pressure, and no means were provided for controlling the energization of the brake in case of sticking or grabbing of the linings thereof. Therefore the energization of the brakes heretofore used was not under sufficient control or unbrakable at will resulting in unsafe braking power as compared to the present invention.

It is therefore the purpose of this invention (1) to provide a dual operated brake of the expansive type which is provided with means for causing the brake to follow a varying friction surface such as an eccentric drum, without appreciable variation of distribution of pressure, its efficiency continuing practically unimpared after imperfections have developed in the wheels or axles on which the brake is used. (2) To provide a brake which is adapted to control its energization, which is extremely flexible without loss of applied pressure and which may be employed on the front as well as the rear wheels of vehicles and in which softness of application of the brake and safety in operation is assured.

With the above and other objects and advantages in view the invention specifically consists in features of construction, arrangement and operation of parts which will hereinafter appear. For purposes of illustration the invention will be described and claimed with reference to the accompanying drawings in which like numbers distinguish like parts and in which:

Fig. 1 is a side elevation of the brake illustrating one form of my invention.

Fig. 2 is a sectional plan view taken on line 2—2 of Fig. 1.

Fig. 3 is a sectional plan view taken on line 2—2 of Fig. 1 but looking in the opposite direction as indicated by arrows 3—3.

Fig. 4 is a side elevation of another form of my invention.

Fig. 5 is a sectional plan view taken on line 5—5 of Fig. 4.

Fig. 6 is a perspective detail view of the form of operating mechanism used on the bottom portion of the brake as illustrated in Figs. 1 and 3 of the drawings.

Fig. 7 is a perspective detail view of the modified form of operating mechanism used on the bottom portion of the brake as illustrated in Figs. 4 and 5 of the drawings including the spaced relationship of the cooperating members for individual adjustment of the shoes of the brake, and Fig. 8 is a perspective detail view of one of the rocker arms used in carrying out the invention including the cooperating members thereof.

For convenience a description of one half of the brake mechanism is given here it being understood that a similar half occupies the other half of the brake mechanism.

In my annexed drawings referring to Fig. 1 a backing-plate fixed to the frame of the vehicle is indicated at 1 and a brake drum is indicated at 2 which is adapted to be mounted on the wheels (not shown) of a vehicle and rotatable therewith. A brake shoe 3 having a curvature conforming to the inner surface of the brake drum 2 with a brake lining 4 secured thereto is mounted in close proximity to the inner surface of the brake drum 2, more specifically the brake shoe 3 is T-shaped in cross-section having a flanged portion 5 and a web 6. The brake shoe 3 is connected to a pin 7 fixably mounted on the backing-plate 1 by means of a link or rocker arm 8 having a forked end portion 9 with elongated slots 10 on each side thereof engaging a pin 11 projecting from the brake shoe 3. The other end 12 of the rocker arm 8 is T-shaped for providing a spacing member which has a bore therein for mounting the T-shaped end portion 12 of the link 8 on the pin 7. Also connecting the pin 7 with the brake shoe 3 is a retractile spring 13 for a purpose which will hereinafter appear. Pivotally mounted on the said pin 7 is an arcuate segment member 14 having a peripheral portion of a curvature conforming to the curvature of said brake shoe 3 and fitting against the inner wall 15 of the web portion 6 thereof. The segment member 14 is built in two sections one on each side of the flange 5 of the brake shoe 3 and the T-shaped end portion 12 of the rocker arm 8. An elongated opening 16 may be provided on the upper end of the segment member 14 for constraining the movement of the segment member 14 on the pin 7.

Rigidly secured to the backing-plate 1 of the vehicle frame is a centering pin 17 having a protuberance 18 which is provided for receiving one end of a coil spring 19. The other end of the coil spring 19 is fitted in a well 20 of a member 21 which bridges the sections of the segment member 14.

At the free end of my built-up segment member 14 is a securing yoke 22. Pivotally connecting the yoke 22 with an adjacent end of the brake shoe 3 is a link in the form of two parallel arm members 23, one of which is positioned on each side of the flange 5 of the brake shoe 3 and pivotally connected thereto by a pin 24. The other end of the arm members 23 pivotally engages a pin 25 on the yoke 22 of said segment member 14. The lower end portions of yokes 22 are provided with a cut-away portion 26 forming projections 27. The cut-away portion 26 is provided to receive an operating cam 28 and is made large enough to allow the operating cam 28 to have sufficient play therein for a purpose which will hereinafter be described.

The cam 28 is asymmetrically mounted on one end of a rock shaft 29 which is journalled in the backing-plate 1 and provided with a crank 30 which is to be connected to a suitable operating mechanism terminating in a brake operating lever (not shown). The cam 28 is symmetrically located between the adjacent yokes 22 of both segment members 14 as illustrated in Figs. 1 and 3 of the drawings and is asymmetrically mounted on the rock shaft 29 to provide a longer end 31 on the lower portion thereof than on its upper portion for a purpose which will also hereinafter appear. In order to retract the segment members 14 to their original position a helical spring 32 is mounted thereon under tension for connecting adjacent portions of the said segment members 14 together. The projections 27 abut each other as shown in Fig. 1 when in inactive or neutral positions. An auxiliary spring 33 is connected between the free end of the segment member 14 and the adjacent end of the brake shoe 3 for causing a softness of setting in the operation of the brake.

Interposed between the upper ends of the brake shoe 3 is an actuated cam 34 having a longer upper end 35 than the lower end thereof and which is asymmetrically mounted on a rock shaft 36 journalled in the backing-plate 1 and operatable by means of a lever 37 which may be connected to suitable service brake pedals (not shown). This cam 34 is formed to provide outwardly diverging side walls which work between wearing plates 38 provided on the ends of the brake shoes 3 adjacent the cam 34.

The operation of my device illustrated in Figs. 1, 2, 3, and 6 of the drawings is as follows: Assuming that the actuating cam 34 has been operated by means of the service brake pedal of the vehicle to which it is to be connected and has been rotated in the direction indicated by the arrow, the ends of the cam 34 come into contact with the wearing plates 38 provided on the upper ends of the shoes 3, and force the shoes 3 towards the rotating drum 2 against the action of the retractile spring 13. One of the shoes 3 is forced in the same direction as the movement of the rotating drum 2 by the longer end 35 on the upper end of the cam 34 for causing the brake lining 4 thereon to frictionally contact with the rotating drum 2 to stop the rotation thereof, whereas the other shoe 3 is forced in the opposite direction thereto to cause the brake lining 4 thereof to frictionally engage the other side of the brake drum 2. The longer end 35 on the upper portion of the cam 34 is provided for causing the brake shoe 3 which it operates in the direction of the rotation of the drum 2 to move faster than the opposite shoe 3 which is operated in an opposite direction thereto thereby producing a soften setting of the brake and lessening the possibility of the brake locking or sticking. Moreover by providing the end 35 longer, less force is required to be applied to the service brake pedal of the vehicle for the setting movement of the cam 34 because less force is needed since the shoe 3, effected by the longer end 35 derives some frictional force from the rotation of the drum 2.

When the auxiliary operating cam 28 is rotated in the direction of the rotating drum 2 it comes in contact with the yokes 22 on the lower ends of the segment members 14 which are connected to the shoes 3 by means of links 23 and causes the lower ends of the shoes 3 to be moved in a direction from each other against the action of the auxiliary spring 33. One of the shoes 3 is moved in the same direction as the movement of the rotating drum 2 by means of the longer end 31 on the lower end of the operating cam 28 while the other shoe 3 is moved in an opposite direction thereto. The upper ends of the shoes 3 are raised against the inner end of the rocker arms 8 and the side walls of the cam 34 which cause the upper end of the shoes 3 to be spread in opposite directions to each other against the rotating drum 2. The links or rocker arms 8 are provided for insuring that the shoes 3 will be spread when operated by the actuating cam 28.

By providing sufficient space between the walls of the yokes 22 of the compression members 14 and the auxiliary cam 28 the brake assembly is made flexible when operated by the cam 34 on the upper end of the brake. This space also provides for sufficient movement of the brake shoe 3 which has been operated in the direction of the rotating of the drum 2 by the longer end 35 of the actuated cam 34 so that the induced frictional force which may be obtained by the rotation of the drum 2 may be taken advantage of for aiding in the stopping of the rotation of the drum 2. This space further provides against sticking of the brake at the initial setting thereof because the first shoe to be operated is cushioned against the coil spring 19 due to the pendulum movement of the compression member 14.

The assembly containing the compression spring 19 is provided for always preserving a correct suspension of the segment members 14 when the brake is not in operation or in other words for centering the brake.

The form of device shown in Figs. 4, 5, and 7 of the drawings is similar to that already described in Figs. 1, 2, 3, and 6 inclusive thereof with the exception of a compensating adjusting means 39. This compensating adjusting means 39 comprises a floating member 40 having an arcuate or rolling surface 41 which bears upon pins 42. A further modification involves provision of elongated slots 43 in the segment members 14, one to receive each of the said pins 42. The location of the pins 42 may be adjusted at will in the slots 43. A minor further difference comprises a connection between the middle of the spring 32' and a lug 45 centrally disposed on the floating member 40. The floating member 40 is provided with a centrally located circular opening 46 extending transversely therethrough in which an eccentric 47 is rotatably mounted upon the non-rotating disk 1 on the frame of the vehicle. On the opposite side of the disk is mounted a rotatable adjusting means 48 for the purpose of raising or lowering the floating member 40 by means of the eccentric 47 against the pins 42 so that further adjustment of the brake may be made to take up for wear of the brake.

The securing yoke members 22' are made of only a sufficient length to permit the floating member 40 to be lowered for adjustment purposes and to insure the efficiency of the auxiliary cam 28 in spreading the compression members 14 apart when operated.

Although in the foregoing certain elements have been described as best adapted to perform the functions allotted to them, nevertheless it is to be understood that various minor changes may be resorted to within the scope of the appended claims without departing from or sacrificing any of the principles of the invention.

Having described my invention what I claim as new and useful is:

1. In an internal expanding brake, a backing plate, a brake drum, a pair of floatingly mounted arcuate shoes for engagement with said drum, a pair of arcuate segments substantially coincident with said brake shoes and engaging the inner arcuate surface of said shoes, a pair of independently actuated cams for actuating said shoes, one of said cams engaging said shoes directly and another thereof operating said shoes indirectly through said segments.

2. In an internal expanding brake, a backing plate, a brake drum, a pair of floatingly mounted arcuate shoes for engagement with said drum, a pair of arcuate segments substantially coincident with said brake shoes and engaging the inner arcuate surface of said shoes, a pair of independently actuated cams for actuating said shoes, one of said cams engaging said shoes directly and another thereof operating said shoes indirectly through said segments, said segments having a pin and slot connection with said backing plate.

3. In an internal expanding brake, a backing plate, a brake drum, a pair of floatingly mounted arcuate shoes for engagement with said drum, a pair of arcuate segments substantially coincident with said brake shoes and engaging the inner arcuate surface of said shoes, a pair of independently actuated cams for actuating said shoes, one of said cams engaging said shoes directly and another thereof operating said shoes indirectly through said segments, and a pair of links connecting said shoes to said backing plate and another pair of links connecting said shoes to said segments.

4. In an internal expanding brake, a backing plate, a brake drum, a pair of floatingly mounted arcuate shoes for engagement with said drum, a pair of arcuate segments substantially coincident with said brake shoes and engaging the inner arcuate surface of said shoes, a pair of independently actuated cams for operating said shoes, one of said cams engaging said shoes directly and the other thereof operating said shoes indirectly through said segments, one of said cams being wedge shaped.

5. In an internal expanding brake, a backing plate, a brake drum, a pair of floatingly mounted arcuate shoes for engagement with said drum, a pair of arcuate segments substantially coincident with said brake shoes and engaging the inner arcuate surface of said shoes, a pair of independently actuated cams for operating said shoes, one of said cams engaging said shoes directly and the other thereof operating said shoes indirectly through said segments and means including compression springs connecting said segments to said backing plate.

6. In an internal expanding brake, a backing plate, a brake drum, a pair of floatingly mounted arcuate shoes for engagement with said drum, a pair of arcuate segments substantially coincident with said brake shoes and engaging the inner arcuate surface of said shoes, a pair of independently actuated cams for operating said shoes, one of said cams engaging said shoes directly and the other thereof operating said shoes indirectly through said segments, a pair of centering pins secured to said backing plate and a compression spring connecting said centering pins and said segments.

7. In an internal expanding brake, a backing plate, a brake drum, a pair of floatingly mounted arcuate shoes for engagement with said drum, a pair of arcuate segments substantially coincident with said brake shoes and engaging the inner arcute surface of said shoes, a pair of independent pivotally mounted actuating cams for operating said shoes, one of said cams engaging said shoes directly and the other thereof operating said shoes indirectly through said segments, each of said cams being asymmetrically mounted on their pivots.

8. In an internal expanding brake, a backing plate, a brake drum, a plurality of floatingly mounted arcuate shoes for engagement with said drum, a plurality of arcuate segments substantially coincident with said brake shoes and engaging the inner arcuate surface of said shoes, said segments having a pin and slot connection with said backing plate at one end, a pair of independent actuated cams for actuating said shoes, one of said cams being wedge shaped and pivotally mounted between said shoes at one end for engaging said shoes directly and another cam pivotally mounted between the said segments at the other end thereof for operating said shoes indirectly through said segments, each of said cams being asymmetrically mounted on its pivot, and means to retract said shoes from each other.

9. In an internal expanding brake, a backing plate, a brake drum, a pair of floatingly mounted arcuate shoes for engagement with said drum, a pair of arcuate segments substantially coincident with said brake shoes and engaging the inner arcuate surface of said shoes, a pair of independently actuated cams for actuating said shoes, one of said cams engaging said shoes directly and another thereof operating said shoes indirectly through said segments, and adjusting means to individually adjust each of said shoes in spaced relation relative to said brake drum.

10. In an internally expanding brake, a backing plate, a brake drum, a pair of floatingly mounted arcuate shoes for engagement with said drum, a pair of arcuate segments substantially coincident with said brake shoes and engaging the inner arcuate surface of said shoes, a pair of independently actuated cams for actuating said shoes, one of said cams engaging said shoes directly and the other thereof operating said shoes indirectly through said segments, each of said segments having a pin and slot connection at one end with said backing plate and a link connection with said shoes at the other end thereof, a tension spring connecting the free ends of said segments together and a pair of auxiliary springs connecting the last mentioned ends of said segments to said brake shoes.

11. In an internal expanding brake, a backing plate, a brake drum, a pair of floatingly mounted arcuate shoes for engagement with said drum, a pair of arcuate segments substantially coincident with said brake shoes and engaging the inner arcuate surface of said shoes, said shoes being T-shaped and said segments having portions on each side of said shoes, a pair of independent actuated cams for actuating said shoes, one of said cams being wedge shaped and engaging said shoes directly and the other thereof operating said shoes indirectly through said segments.

12. In an internal expanding brake, a backing plate, a brake drum, a pair of floatingly mounted arcuate shoes for engagement with said drum, said shoes having a flange portion and a web portion, a pair of pins fixably mounted on said backing plate, a pair of links and a retractile spring connecting said shoes to said pins, a pair of arcuate segments substantially coincident with said brake shoes and engaging the inner arcuate surface of said shoes, said segments having a pin and slot connection at one end with the said pins on said backing plate, portions provided on said segments, said portions being adjacent each side of the flanges of said shoes, a pair of centering pins mounted on said backing plate, a compression spring between each of said centering pins and the portions of said segments, a pair of links connecting the other end of said segments to said shoes, a pair of independently actuated asymmetrically mounted cams for actuating said shoes, one of said cams being wedge shaped and engaging said shoes directly and the other thereof operating said shoes indirectly through said segments, and a mechanism for individually adjusting each of said shoes in spaced relation relative to said brake drum.

CHARLES S. BURNETT.